(12) United States Patent
Saitou

(10) Patent No.: US 6,756,894 B2
(45) Date of Patent: Jun. 29, 2004

(54) REMOTE MONITORING SYSTEM FOR UNINTERRUPTIBLE POWER SUPPLY

(75) Inventor: Hisaaki Saitou, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 106 days.

(21) Appl. No.: 10/245,595

(22) Filed: Sep. 18, 2002

(65) Prior Publication Data

US 2003/0105675 A1 Jun. 5, 2003

(30) Foreign Application Priority Data

Nov. 30, 2001 (JP) ....................................... 2001-365464

(51) Int. Cl.[7] ............................................. G08B 26/00
(52) U.S. Cl. ........................ 340/505; 340/506; 340/3.1
(58) Field of Search ................................ 340/505, 506, 340/539.14, 539.16, 539.17, 3.1, 5.2

(56) References Cited

U.S. PATENT DOCUMENTS

| | | | | |
|---|---|---|---|---|
| 4,567,557 A | * | 1/1986 | Burns | ........................... 700/16 |
| 4,801,937 A | * | 1/1989 | Fernandes | .............. 340/870.16 |
| 6,311,105 B1 | * | 10/2001 | Budike, Jr. | ................. 700/291 |
| 6,388,399 B1 | * | 5/2002 | Eckel et al. | ................. 315/312 |

FOREIGN PATENT DOCUMENTS

JP                3-186050           8/1991

OTHER PUBLICATIONS

APC Company; "Home/Products/Support/Services/Selection" http://www,apc.com/tool/geomap.
APC Company; "Remote Monitoring Service", http://www.apcc.com/support/service/cfm.
APC Company; Catalog to introduce "Remote Monitoring Service".

* cited by examiner

*Primary Examiner*—Daryl Pope
(74) *Attorney, Agent, or Firm*—Leydig, Voit & Mayer, Ltd.

(57) ABSTRACT

A remote monitoring system for an uninterruptible power supply includes a screen for allowing a particular customer possessing a power facility and intending to receive remote maintenance service to input customer identification information for himself. The remote monitoring system also includes a screen based on the input customer identification information for allowing the particular customer to view a particular remote maintenance record file transmitted through a communication line and in which maintenance information regarding the power facility including the uninterruptible power supply is described. The remote monitoring system for uninterruptible power supply further includes a device that has a screen for the particular customer to transmit an order through the communication line based on the particular remote maintenance record file.

7 Claims, 8 Drawing Sheets

REMOTE MONITORING SYSTEM FOR UNINTERRUPTIBLE POWER SUPPLY

BACKGROUND OF THE INVENTION

1. Field of the Invention

The present invention relates to a remote monitoring system for an uninterruptible power supply that carries out a remote monitoring maintenance for a power facility including an uninterruptible power supply.

2. Description of Related Art

FIG. 8 is a block diagram showing an arrangement of a conventional remote monitoring apparatus, which is shown in, for example, the Japanese Patent Publication (unexamined) No. Hei 3-186050, for remote monitoring an uninterruptible power supply for an elevator.

In the drawing, reference numeral 1 designates an area, for example, a power supply room in a building. Numeral 2 designates an uninterruptible power supply installed in the power supply room of the building. Numeral 3 designates a remote monitoring apparatus provided for monitoring the uninterruptible power supply 2. Numeral 4 designates a dedicated line for a telephone set. Numeral 5 designates a telephone line system. Numeral 6 designates a center apparatus for remote monitoring the uninterruptible power supply via the telephone line system 5, and this center apparatus 6 is provided in order to monitor the uninterruptible power supply installed in the power supply room of the building.

Numerals 31 to 35 show devices and circuits disposed within the remote monitoring apparatus 3. Numeral 31 designates a modem, numeral 32 designates an incoming call detection circuit, and numeral 33 designates a CPU. Numeral 34 designates an inter-transmission I/F, and numeral 35 designates an inter-apparatus transmission I/F. Numeral 7 designates a dedicated transmission line for providing a connection between the inter-apparatus transmission I/Fs 35, and this dedicated transmission line 7 is used for controlling each remote monitoring apparatus 3 provided for the purpose of carrying out the remote monitoring.

Now, operation of the above conventional remote monitoring apparatus is described.

In the center apparatus 6, the remote monitoring is carried out in a regular or irregular timing on the remote monitoring apparatus 3 having an outgoing and incoming detection functions through the same telephone lines 4 extending from the telephone line system 5 via the telephone line system 5.

The remote monitoring apparatus 3 includes line connecting controlling relay contacts respectively on the same telephone lines 4 so that each of the remote monitoring apparatuses may be arranged in parallel. Further, the remote monitoring apparatus 3 includes the inter-apparatus transmission I/F for controlling communication conditions of each remote monitoring apparatus and the transmission I/F for delivering a monitoring transmission with an apparatus subject to the remote monitoring. When the incoming call detection circuit 32 of the remote monitoring apparatus 3a detects any incoming signal from the center apparatus 6, the CPU33 controls the communication between the center apparatus 6 and the uninterruptible power supply 2a so that only the remote monitoring apparatus 3a connected to the telephone line through a line connection control relay setting is authorized to obtain a call-outgoing right and an incoming monitoring right. Thus, the remote monitoring on the power facility including the uninterruptible power supply is carried out.

On the other hand, when there is any incoming call from the center apparatus 6 to the other remote monitoring apparatus 3b, the remote monitoring is carried out in the following manner. That is, the CPU 33 provides a control to inform the remote monitoring apparatus 3b of communication conditions via a dedicated transmission line 7, thus providing a transfer control. Further, at the time of making any transmission request to any other remote control monitoring apparatus, the CPU 33 controls the relay contact points for controlling the lines provided in each remote control monitoring apparatus through the dedicated transmission line, whereby the call-outgoing rights and the incoming monitoring rights of the remote control monitoring apparatus 3a are abandoned. Meanwhile, the CPU 33 provides a further control for granting a current outgoing right and an incoming monitoring right to the remote control monitoring apparatus 3b, thereby controlling the remote monitoring communication between the uninterruptible power supply 2b and the center apparatus 6 through the inter-transmission I/F 34 of the remote monitoring apparatus 3b having the current outgoing right and the incoming monitoring right. Thus, the remote monitoring communication of the power facility including the uninterruptible power supply is carried out.

SUMMARY OF THE INVENTION

In the conventional remote monitoring system operated via a communication line such as telephone line for a power facility including any interruptible power supply, a simple remote monitoring on situations of the power facility including a plurality of uninterruptible power supplies is carried out with the use of, e.g., any center apparatus installed by any company conducting a remote maintenance service.

Generally, an object of carrying out the remote monitoring is to confirm a root cause yielding any abnormality or trouble on the power facility, upon occurring the abnormality or trouble in the power facility, and detect at an early stage a specific apparatus where such abnormality or trouble occurs. A further object is to eliminate the causes of the abnormality or trouble, and then promptly restore the power facility to a sound state. For that purpose, it is not always sufficient to carry out alone a remote monitoring on the situation of the apparatus. But construction management as well as operation management of the power facility supplied by the manufacturer (supplier) to the customer (user) should be also sufficiently followed and understood. In this sense, regularly or daily inspecting operating conditions of the power facility and preparing a maintenance record so as to understand or grasp the normal running conditions of the power facility will be essential. However, in the conventional remote monitoring system for uninterruptible power facility, a problem exists in that such operating management has not been always sufficiently carried out.

The present invention has been made to solve the above-discussed problem and has an object of obtaining a remote monitoring system for uninterruptible power facility capable of achieving smooth information communication can be realized mutually between a remote maintenance service provider and a customer, and of being promptly restored to a sound state.

To accomplish the foregoing object, in a remote monitoring system for uninterruptible power facility according to this invention, remote maintenance service is carried out by a remote maintenance service provider based on a contract between the mentioned remote maintenance service provider and a customer, and in which the remote monitoring system for uninterruptible power supply has a screen for allowing a particular customer to input customer identification information about the particular customer who possesses a power facility including an uninterruptible power supply and intends to receive the remote maintenance service.

Further, the remote monitoring system for uninterruptible power supply has a screen for allowing the mentioned particular customer to view a particular remote maintenance record file capable of being transmitted by communication line and in which a maintenance information about the power facility including the uninterruptible power supply, being a subject matter of receiving an order of the remote maintenance service, is described.

Furthermore, the remote monitoring system for uninterruptible power supply has a screen for allowing the mentioned particular customer to transmit an order using the communication line based on the mentioned particular remote maintenance record file.

As a result, it becomes possible to achieve appropriately a remote monitoring system for uninterruptible power facility in which an order for the remote maintenance using the communication line can be properly received, and a smooth information communication mutually between the remote maintenance service provider and the customer.

The foregoing and other object, features, aspects and advantages of the present invention will become more apparent in the course of the following detailed description of the present invention when taken in conjunction with the accompanying drawings.

DETAILED DESCRIPTION OF THE INVENTION

Embodiment 1.

Figure 1:
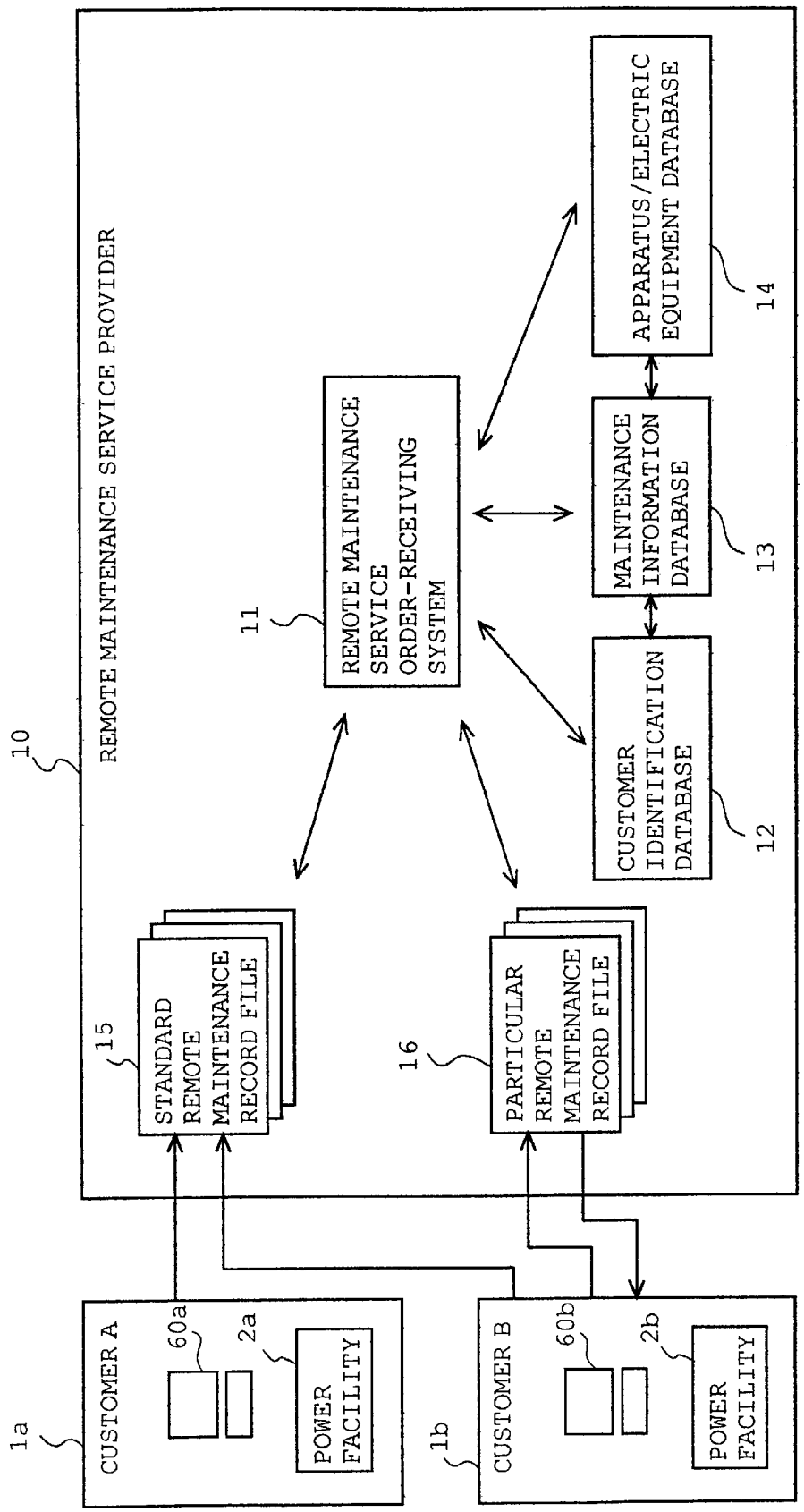
FIG. 1 is a block diagram showing an arrangement of a remote monitoring system for an uninterruptible power facility according to a first preferred embodiment of the present invention.

A first preferred embodiment according to this invention is hereinafter described referring to FIG. 1. FIG. 1 is a block diagram showing arrangement of a system in which a remote maintenance service provider receives an order for a remote maintenance service from a customer based on a standard remote maintenance record file provided by the remote maintenance service provider.

In FIG. 1, reference numeral 1 designates a customer's area such as building, power supply room or monitoring booth in the building. Numeral 1a designates a situation of a general customer A, who plans to introduce a power facility 2a including an uninterruptible power supply that requires a remote maintenance. Numeral 1b designates a situation of a particular customer B who has already possessed a power facility 2b including an uninterruptible power supply and has already concluded a contract of a remote maintenance service.

The customer situation 1a or 1b also shows conditions of having information processors 60a, 60b respectively. The information processors 60a, 60b enable the customers to access to a system possessed by a remote maintenance service provider 10, and read information possessed by the remote maintenance service provider 10, or input necessary information required by the remote maintenance service provider 10.

Numeral 11 designates a remote maintenance service order-receiving system used by the remote maintenance service provider 10 for receiving a contract order for the remote maintenance service. Numeral 12 designates a customer identification database in which name, address, contact telephone number, business category and the like of the customer are recorded. Numeral 13 designates a maintenance information database in which maintenance manual based on type of apparatus used in the power facility, type or kind of electric equipment to be used, and the like are recorded. Numeral 14 designates an apparatus/electric equipment database in which type, rating, date of manufacture, lifetime and the like of the apparatus or electric equipment are recorded. It is also shown in FIG. 1 that these databases can be accessed from the remote maintenance service order-receiving system 11 in a relational manner. Further, the remote maintenance service order-receiving system 11 allows the general customer 1a and the particular customer 1b to read a standard remote maintenance record file 15, thereby showing that booking for the remote maintenance service contract can be done. For example, in the case where any remote maintenance service contract is made from the particular customer 1b, the remote maintenance service order-receiving system 11 operates in the following manner. That is, the particular customer 1b who has ordered a remote maintenance service is notified of a particular remote maintenance record file 16, which is prepared by updating the standard remote maintenance record file 15 based on the databases such as customer identification database 12, the maintenance information database 13, the apparatus/electric equipment database 14 and others in accordance with a customer identification information of the particular customer 1b. In this manner, the remote maintenance service order-receiving system 11 shows that there is a notice of starting the remote maintenance service.

In addition, the remote maintenance service provider 10 and the customers 1a, 1b are system-arranged so as to be able to mutually conduct information communication by electronic communication means through a network using any communication line such as telephone line. That is, the standard remote maintenance record file 15, the particular remote maintenance record file 16 and the like are arranged so as to be able to conduct information communication by the electronic communication means through the network using any communication line such as telephone line.

The remote maintenance service provider 10 expects booking of the remote maintenance service, and discloses information regarding the maintenance service to the general customers using the standard remote maintenance record file 15 by means of the remote maintenance service order-receiving system 11. The customer A under the situation 1a can read contents of the information provided by the remote maintenance service provider 10 on the information processor (terminal) 60a possessed by the customer A himself. For example, in the case where there is any customer like the customer B intending to receive a remote maintenance service for the power facility 2a possessed by the customer B himself, the customer B inputs necessary information such as personal customer identification information or information of specification concerning the power facility 2a using an entry form incorporated in the provided information of the standard remote maintenance record file 15, whereby offering an application for the remote maintenance service to remote maintenance service provider 10. In the case where the remote maintenance service order-receiving system 11 possessed by the remote maintenance service provider 10 receives any request from the customer B, the remote maintenance service order-receiving system 11 retrieves a particular remote maintenance record file 16 based on the received customer identification information 12, or prepares the particular remote maintenance record file 16 when necessary by utilizing the information in the various databases such as the customer identification database 12, the maintenance information database 13, and the apparatus/electric equipment database 14. Further, the remote maintenance service provider 10 informs the customer B of receiving the request. Upon receipt of such notification from the remote maintenance service provider 10, it becomes possible for the customer B to read the particular remote maintenance record file 16 for its own use.

As described above, the general customer can reads the maintenance information prepared preliminarily by the remote maintenance service provider, and can make immediately an application for the remote maintenance service using the read contents of the maintenance information in situ. As a result, any troublesome procedure is not necessary, and the customer can be promptly blessed with a service.

Further, professionals carry out suitably a power supply management regarding the power facility possessed by the customer himself, whereby any cause for abnormality or trouble can be found out more rapidly and exactly. Furthermore, it becomes possible to get a grip on any happening or phenomena that may occur properly in the power facility, thereby enabling planning maintenance for the power facility.

As a result, the remote monitoring system for uninterruptible power supply brings about a higher reliability in the power facility used as a power supply for, e.g., a computer. Thus, it becomes possible to reduce a restoration cost of the power facility incurred by any occurrence of abnormality or trouble in the power facility.

That is, a remote monitoring system for uninterruptible power facility according to this first embodiment of the invention being capable of receiving an order for remote maintenance by electronic communication means using any electronic maintenance record file, and in which remote maintenance service is carried out by a remote maintenance service provider 10, being a subject of providing the mentioned remote maintenance service, based on a contract between the mentioned remote maintenance service provider 10 and a customer, the remote monitoring system for interruptible power supply includes: means of providing a screen for allowing a particular customer to input customer identification information of the particular customer who possesses a power facility including an uninterruptible power supply and intends to receive the remote maintenance service; means of providing a screen for allowing the mentioned particular customer to view a particular remote maintenance record file 15 capable of being transmitted by electronic communication means and in which a maintenance information about the power facility including the uninterruptible power supply, being an object of receiving an order of the remote maintenance service, is described; and means of providing a screen for allowing the mentioned particular customer to transmit an order using the electronic communication means based on the mentioned particular remote maintenance record file 15. As a result, it becomes possible to achieve a remote monitoring system for uninterruptible power facility in which an order for the remote maintenance can be properly received by electronic communication means utilizing any communication line network such as telephone line. Consequently, a smooth information communication mutually between the remote maintenance service provider and the customer is appropriately achieved.

Embodiment 2.

Figure 2:
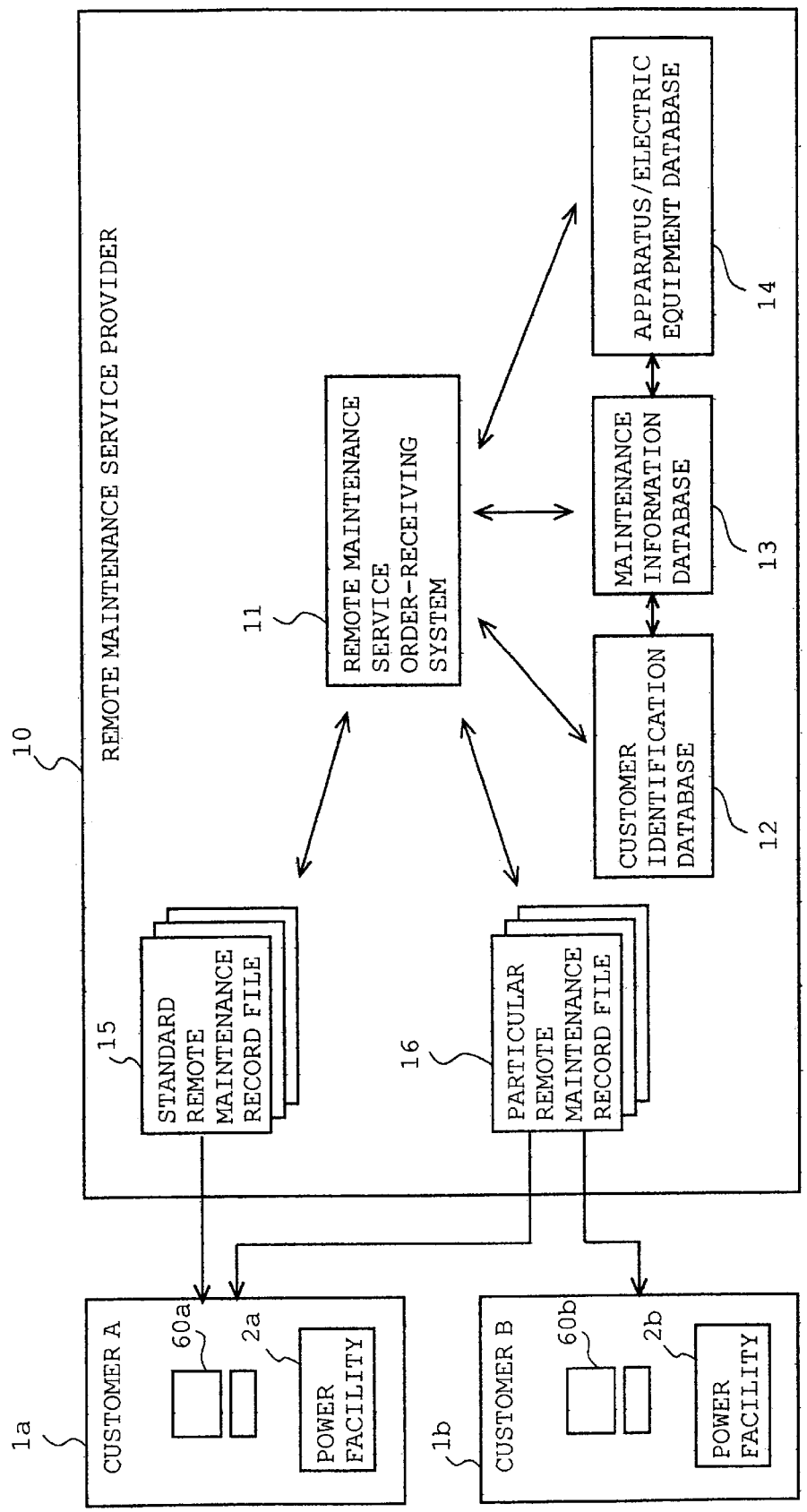
FIG. 2 is a block diagram showing an arrangement of a remote monitoring system for an uninterruptible power facility according to a second embodiment of the invention.

A second preferred embodiment according to the invention is hereinafter described with reference to FIG. 2. FIG. 2 is a block diagram showing an arrangement of a remote monitoring system for uninterruptible power facility according to the second embodiment.

This second embodiment includes the same arrangement except specific constitution described herein and achieves the same advantages as in the foregoing first embodiment. The same reference numerals are designated to the same or like parts.

In the foregoing first embodiment, a method of receiving an order for the remote maintenance service from the customer based on the standard maintenance record file provided by the remote maintenance service provider is shown. FIG. 2, however, shows another method of providing the standard remote maintenance record file 15 and the particular remote maintenance record file 16 by the remote maintenance service provider 10. Both remote maintenance record file 15 and 16 are contents of the remote maintenance service for the power facility 2, to be read by the general customer 1a and the particular customer 1b.

It is understood from FIG. 2 that the general customer can also access to the remote maintenance service contents for the particular customer, thereby enabling both customers to have more awareness of the significance of power supply management or deeper understanding thereof. In this manner, a secondary advantage is achieved such that reliability in power facility including the uninterruptible power supply used as an important power supply for, e.g., a computer is improved.

That is, a remote monitoring system for interruptible power supply according to this second embodiment of the invention being capable of providing a remote maintenance record file by electronic communication means, and in which a remote maintenance service is carried out by a remote maintenance service provider based on a contract between the mentioned remote maintenance service provider and a customer, the remote monitoring system for interruptible power supply includes: means of providing a screen for allowing a customer to input customer identification information about the customer who possesses a power facility including an uninterruptible power supply; and means of providing a screen for allowing the customer to view a particular remote maintenance record file 16 for a particular customer capable of being transmitted by electronic communication means and in which a maintenance information about the power facility including the uninterruptible power supply, being an object of receiving an order of the remote maintenance service is described based on the mentioned customer identification information, or a standard maintenance record file 15 for a general customer. As a result, it becomes possible to achieve a remote monitoring system for uninterruptible power facility in which remote maintenance record file can be provided without fail by electronic communication means utilizing any communication line network such as telephone. Consequently, a smooth information communication mutually between the remote maintenance service provider and the customer is achieved.

Embodiment 3.

Figure 3:
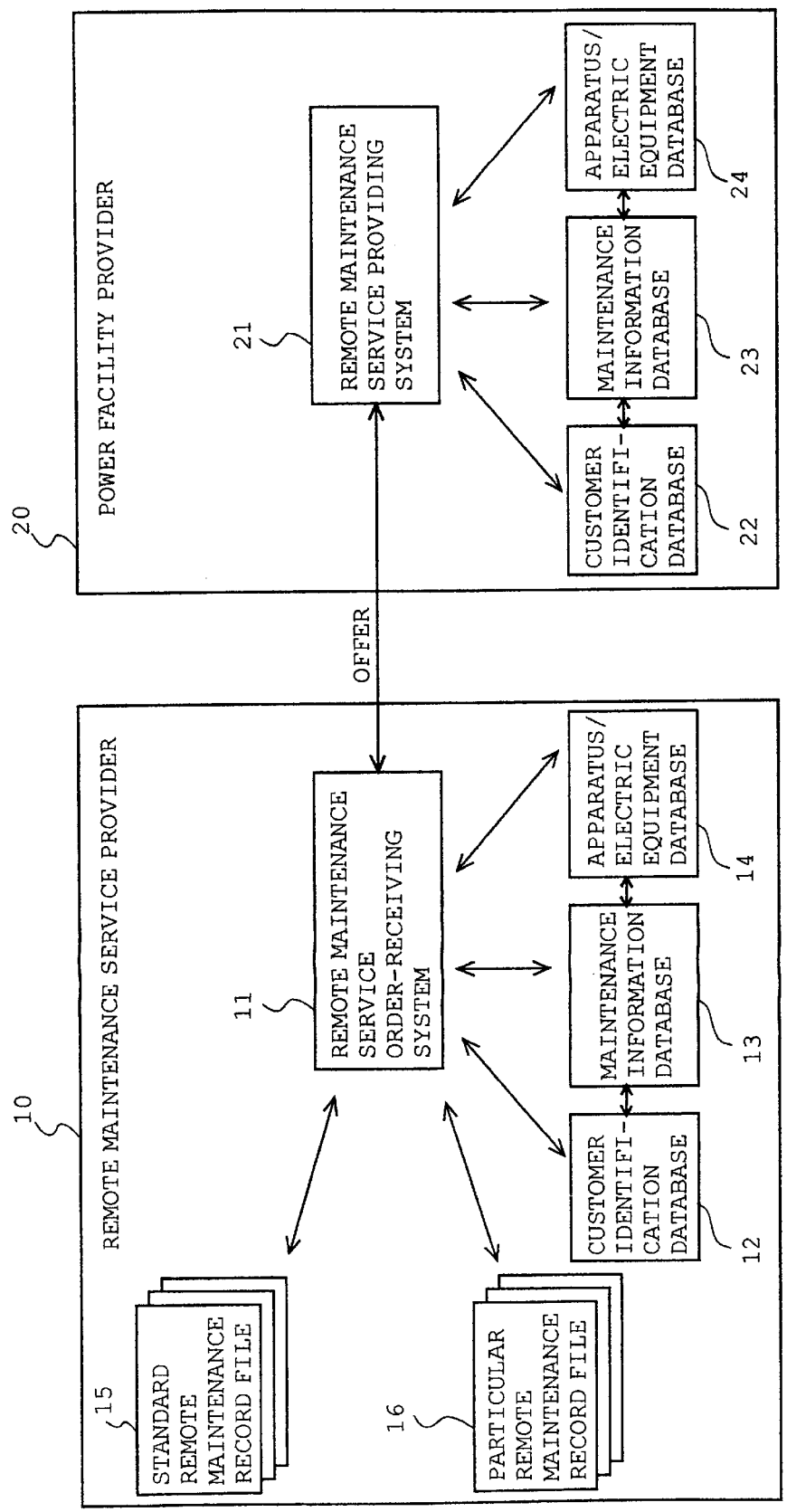
FIG. 3 is a block diagram showing an arrangement of a remote monitoring system for an uninterruptible power facility according to a third embodiment of this invention.

A third preferred embodiment according to this invention is hereinafter described with reference to FIG. 3. FIG. 3 is a block diagram showing a system in which, based on a customer identification information, the remote maintenance service provider prepares information regarding an article such as uninterruptible power supply or electric equipment inputted by a power facility provider and maintenance information about the power facility composed of the foregoing uninterruptible power supply and electric equipment, in the form of a particular remote maintenance record file or a standard remote maintenance record file.

This third embodiment has the same arrangement and achieves the same effect as in the foregoing first embodiment except specific constitution described herein. The same reference numerals are designated to the same or like parts.

Referring to FIG. 3, information of any article such as apparatus or electric equipment regarding the power facility including the uninterruptible power supply being a subject matter of receiving an order for a remote maintenance service on the side of the remote maintenance service provider 10, and other information about, e.g., maintenance manner being service consents, are basically provided from a power facility provider 20. The remote maintenance service provider 10 carries out necessary data management based on a variety of databases such as the customer identification database 12, the maintenance information database 13, the apparatus/electric equipment database 14.

On the other hand, the power facility provider 20 also carries out management of data collected at the time of manufacturing the power facility in conformity with the customer identification information based on various databases such as a customer identification database 22, a maintenance information database 23, an apparatus/electric equipment database 24 and others in the similar manner to classification of the data in the remote maintenance service provider 10.

The remote maintenance service order-receiving system 11 functions as a management system on the side of the remote maintenance service provider 10, while the remote maintenance service supply system 21 functions as a management system on the side of the power facility provider 20. In accordance with frequency of supplying the power facility to a customer destination, every information in all of the various databases including the customer identification database 22, the maintenance information database 23, and the apparatus/electric equipment database 24 managed by the remote maintenance service supply system 21 is provided to each of various databases including the customer identification database 12, the maintenance information database 13, and the, apparatus/electric equipment database 14 managed by the remote maintenance service order-receiving system 11, thus carrying out update of a variety of databases.

The standard remote maintenance record file 15 is a maintenance record file that is prepared under the management of the remote maintenance service order-receiving system 11 based on the customer identification information using the various databases including the customer identification database 12, the maintenance information database 13, and the apparatus/electric equipment database 14 which databases are managed by the remote maintenance service order-receiving system 11. The prepared checkup record file is managed by the remote maintenance service order-receiving system 11.

In addition, the particular remote maintenance record file 16 is a maintenance file prepared specifically under the management of the remote maintenance service order-receiving system 11 likewise the standard remote maintenance record file 15 with the use of the information about the power facility from the particular customer.

In this respect, between the remote maintenance service order-receiving system 11 and the remote maintenance service supply system 21, such a system is arranged as to enable the mutual information communication by the electronic communication means through the network using a communication line such as telephone line.

Referring to the drawing, although both of the remote maintenance service provider 10 and the power facility provider 20 possess the common same customer management data, both provider can share the customer information in detail and hold an advantage of common information being laterally transferred. As a result, a secondary advantage is such that a quality of the equipment may be improved on the side of the power facility provider due to feedback of the customer information.

That is, a remote monitoring system for interruptible power supply according to this third embodiment of the invention being capable of preparing a remote monitoring maintenance record file by electronic communication means, and in which a remote maintenance service is carried out by a remote maintenance service provider 10, being a subject of providing the mentioned remote maintenance service, based on a contract between the mentioned remote maintenance service provider 10 and a customer, the remote monitoring system for interruptible power supply includes: means of providing a screen for allowing to input article information about power supply equipment including an uninterruptible power supply, being an object of receiving an order of the remote maintenance service; means of preparing a particular remote maintenance record file 16 for a particular customer capable of being transmitted by electronic communication means and in which any article information is described and/or a standard maintenance record file 15 for a general customer capable of being transmitted by electronic communication means, being different from the mentioned particular remote maintenance record file 16 for a particular customer, and in which the mentioned article information is described; and means of providing the mentioned prepared particular remote maintenance record file 16 or the mentioned standard maintenance record file 15. As a result, it becomes possible to achieve a remote monitoring system for uninterruptible power facility in which any remote monitoring maintenance record file can be accurately prepared by electronic communication means utilizing any communication line network such as telephone line. Consequently, a smooth information communication mutually between the remote maintenance service provider and the customer is appropriately achieved.

Embodiment 4.

Figure 4:
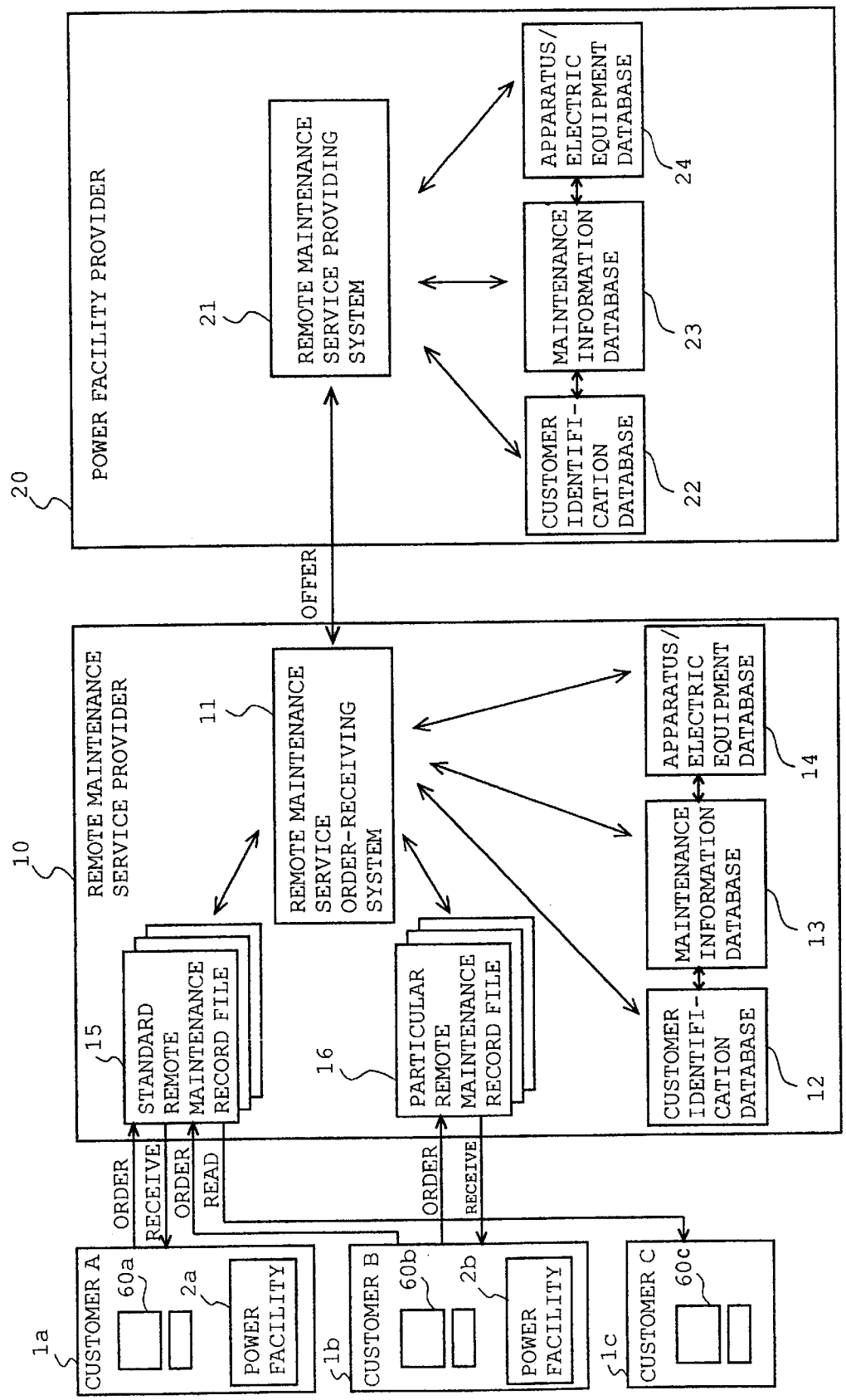
FIG. 4 is a block diagram showing an arrangement of a remote monitoring system for an uninterruptible power facility according to a fourth embodiment of the invention.

A fourth preferred embodiment according to this invention is hereinafter described with reference to FIG. 4. FIG.

4 is a block diagram showing an overall picture of a system in which the remote maintenance service provider prepares a particular remote maintenance record file or a standard remote maintenance record file based on article information or maintenance information inputted by the power supply provider, provides those maintenance record files to the customer, receives an order for the remote maintenance service based on the remote maintenance record files, and carries out the remote maintenance service.

This fourth embodiment has the same arrangement and achieves the same effect as in the foregoing first to third embodiments except specific constitution described herein. The same reference numerals are designated to the same or like parts.

Referring to the diagram, although the remote maintenance service order-receiving system 11 possesses the various databases same as the remote maintenance service supply system 21 possesses, the remote maintenance service order-receiving system 11 communicates with the customers on the order for remote maintenance service utilizing the standard remote maintenance record file 15 or the particular remote maintenance record file 16. Accordingly, the remote maintenance service order-receiving system 11 brings about a tendency of improving accuracy in various databases including the customer identification database 12, the maintenance information database 13, and the apparatus/electric equipment database 14, each possessed by the remote maintenance service order-receiving system 11. Therefore, by regularly exchanging information in the various databases including the customer identification database 22, the maintenance information database 23, and the apparatus/electric equipment database 24, each possessed by the remote maintenance service supply system 21, with the various databases on the side of the remote maintenance service order-receiving system 11 to secure a consistency between both systems, an advantage is assured such that accuracy in the various databases on the power facility provider side can be improved all the more.

That is, a remote monitoring system for uninterruptible power supply according to this fourth embodiment of the invention being capable of placing an order by electronic communication means using an electronic remote maintenance record file, and in which a remote maintenance service is carried out by a remote maintenance service provider 10, being a subject of providing a remote maintenance service, based on a contract between the remote maintenance service provider 10 and a customer, the interruptible power supply remote monitoring system includes: means of providing a screen for allowing a provider to input any article information or inspection information of a power facility including an uninterruptible power supply, being a subject of receiving an order for the remote maintenance service; means of preparing a particular remote maintenance record file 16 for a particular customer capable of being transmitted by electronic communication means, and in which the mentioned article information is described, using the mentioned article information and inspection information, and a standard remote maintenance record file 15 for a general customer capable of being transmitted by electronic communication means, being different from the mentioned particular remote maintenance record file, and in which the mentioned article information is described; means for providing a screen for allowing the mentioned customer to input any customer identification information of the customer; means of providing a screen based on the mentioned customer identification information to allow the mentioned customer to view information of the mentioned particular remote maintenance record file 16 or the mentioned standard remote maintenance record file 15; means of providing a screen for allowing the mentioned customer to input an order for the remote maintenance service capable of being transmitted by the electronic communication means based on the article information described in the mentioned particular remote maintenance record file 16 or the mentioned standard maintenance record file 15; and means of providing a screen for allowing to transmit a content of a remote maintenance contract capable of being transmitted by the electronic communication means and inputted by the mentioned customer, toward the mentioned provider and allow the mentioned provider to view the content.

As a result, it becomes possible to achieve a remote monitoring system for uninterruptible power facility in which an order can be properly received by electronic communication means utilizing any communication line network such as telephone line. Consequently, a smooth information communication mutually between the remote maintenance service provider and the customer is appropriately achieved.

Embodiment 5.

Figure 5:
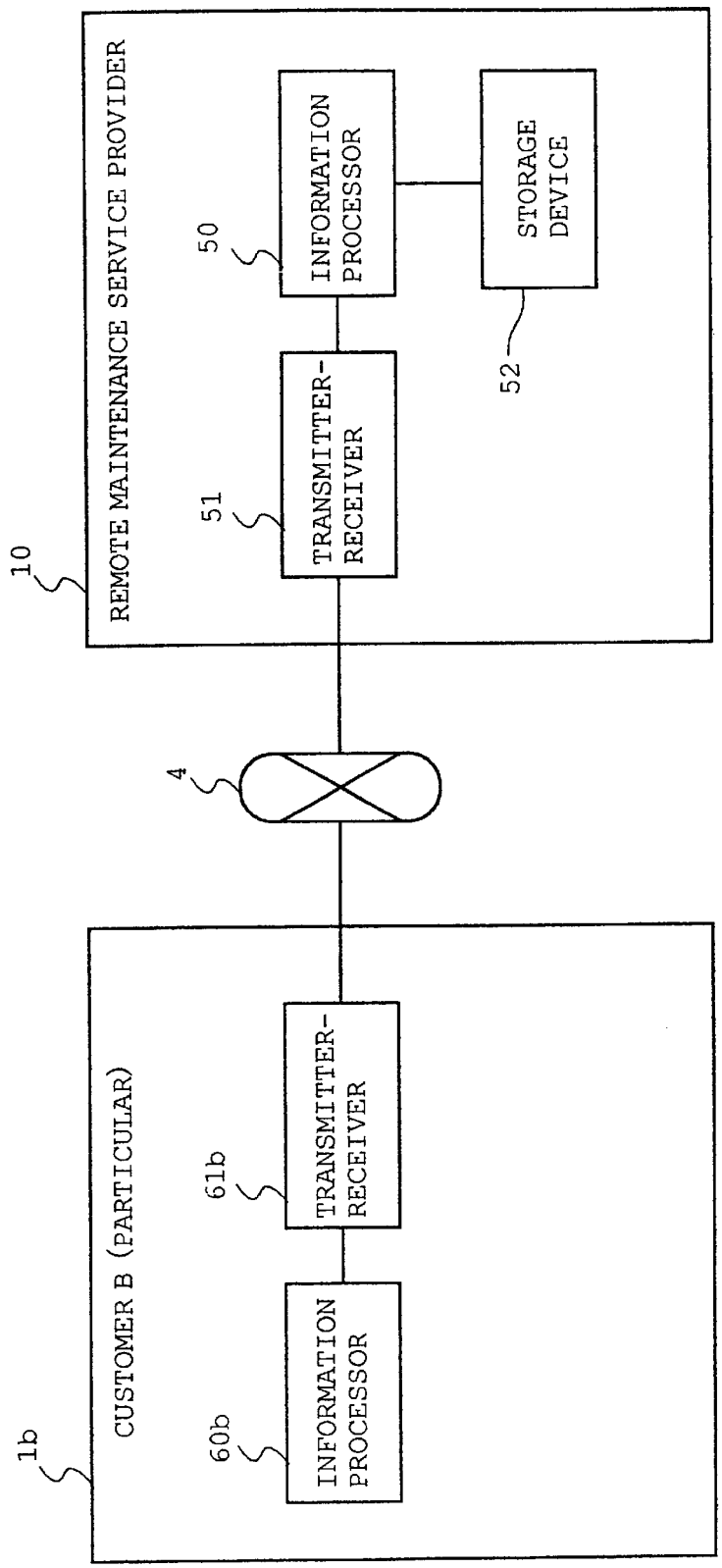
FIG. 5 is a block diagram showing an arrangement of a remote monitoring system for an uninterruptible power facility according to a fifth embodiment of this invention.

A fifth preferred embodiment of the invention is hereinafter described with reference to FIG. 5. FIG. 5 is a block diagram showing an arrangement of an apparatus for receiving an order for the remote maintenance service from a general customer based on the standard maintenance record file provided by the remote maintenance service provider.

This fifth preferred embodiment has the same arrangement and achieves the same advantages as in the foregoing first to fourth embodiments except specific constitution described herein. The same reference numerals are designated to the same or like parts.

Referring to FIG. 5, the remote maintenance service provider 10 includes: a transmitter-receiver 51 for conducting transmission/receiving of information to and from a particular customer side terminal 60b; a storage device 52 for storing a remote maintenance record file capable of being transmitted by electronic communication means and in which information of the power facility, being a subject of receiving the remote maintenance service contract, is described; and a processor 50 for conducting processing with the use of the mentioned transmitter-receiver and the mentioned storage device. In the case where the transmitter-receiver 51 receives any customer identification information showing that he is a particular customer from the mentioned particular customer side terminal 60b, the mentioned remote maintenance record file having been read out is transmitted to the particular customer 1b side terminal 60b by means of the transmitter-receiver 51. Then a transmitter-receiver 61b is caused to receive any maintenance information based on the particular maintenance record and capable of being transmitted using electronic communication means via a communication line 4.

Referring to the drawing, since the information concerning the maintenance of the power facility is stored in the storage device 52 possessed by the remote maintenance service provider 10, the particular customer terminal 60b of the customer 1b is in principle not required to have any storage device for conducting the remote maintenance of the power facility in receiving the remote maintenance service. Accordingly, it is not necessary for the customer 1b to be provided with any particular information processor for placing an order for the remote maintenance service of the power facility, which brings about flexibility of the system. Consequently, the order for the remote maintenance service can be placed with an inexpensive system.

That is, a remote monitoring system for uninterruptible power facility according to this fifth embodiment of the invention including a remote maintenance contract receiving device through electronic communication means, and in which remote maintenance service is carried out by a remote maintenance service provider 10, being a subject of providing the mentioned remote maintenance service, based on a contract between the mentioned remote maintenance service provider 10 and a customer, the remote monitoring system for interruptible power supply includes: a transmitter-receiver 51 for conducting transmission/receiving of information to and from a particular customer side; a storage device 52 for storing a remote maintenance record file capable of being transmitted by electronic communication means and in which information of the power facility, being an object of receiving an contract for a remote maintenance contract, is described; and a processor 50 for conducting processing with the use of the mentioned transmitter-receiver and the mentioned storage device; and in which when the transmitter-receiver 51 receives any customer identification information showing that he is a particular customer from the mentioned particular customer side terminal 60b, the mentioned processor 50 reads out the mentioned remote maintenance record file corresponding to the mentioned customer identification information, the mentioned remote maintenance record file having been read out is transmitted to the particular customer side terminal 60b by means of the transmitter-receiver 51, and the transmitter-receiver 51 is caused to receive any maintenance information based on the particular maintenance record and capable of being transmitted using electronic communication means. As a result, it becomes possible to achieve a remote monitoring system for uninterruptible power facility in which a remote maintenance contract can be properly received by the remote maintenance contract receiving device through the electronic communication means utilizing any communication line network such as telephone line. Consequently, a smooth information communication mutually between the remote maintenance service provider and the customer is appropriately achieved.

Embodiment 6.

Figure 6:
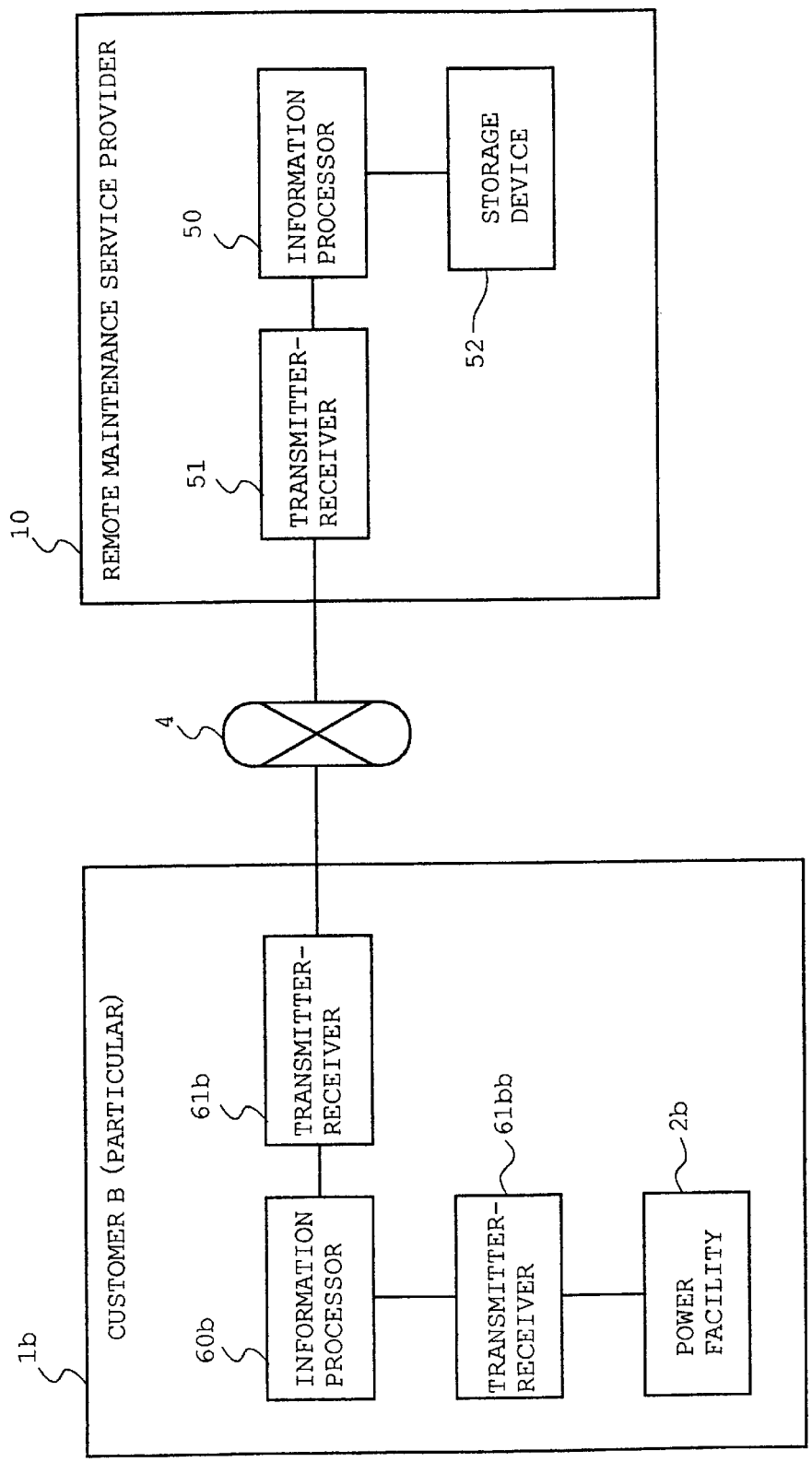
FIG. 6 is a block diagram showing an arrangement of a remote monitoring system for an uninterruptible power facility according to a sixth embodiment of the invention.

A sixth preferred embodiment according to the invention is hereinafter described with reference to FIG. 6. FIG. 6 is a block diagram showing an arrangement of an apparatus with which the remote maintenance service provider side provides a standard maintenance record file to a general customer, and a particular maintenance record file to a particular customer.

This sixth embodiment has the same arrangement and achieves the same advantages as in the foregoing fifth embodiment except specific constitution described herein. The same reference numerals are designated to the same or like parts.

Referring to FIG. 6, it is shown that the remote maintenance service provider 10 includes: the transmitter-receiver 51 for conducting the transmission/receiving of information to and from the power facility 2b on the side of the customer 1b; the storage device 52 for storing information of the remote maintenance record file for a particular customer concerning the power facility 2b, being a subject of receiving a remote maintenance service contract and capable of being transmitted by the electronic communication means, and information of the standard maintenance record file for a general customer capable of being transmitted by the electronic communication means; and a information processor 50 for conducting processing with the use of the mentioned transmitter-receiver 51 and the storage device 52. In the case where the transmitter-receiver 51 receives any customer identification information from the information processor 60b on the side of the customer 1b, the mentioned information processor 50 can read out the remote maintenance record file or the standard maintenance record file from the storage device 52 based on the customer identification information, and transmit the mentioned read-out remote maintenance record file using the transmitter-receiver 51 to the information processor 60b on the side of the customer 1b or to the information processor on the side of the power supply provider.

It is understood from the drawing that, as to a relation of distance between the remote maintenance service provider 10 and the customer 1b, there is less regional characteristic than in the relation for carrying out the remote maintenance service via the communication line. Accordingly, considering expenses for traveling time or travel for the maintenance and inspection, and charge on the remote maintenance service, the remote maintenance service can achieve a cost reduction for the maintenance and an efficient maintenance.

That is, a remote monitoring system for uninterruptible power supply according to the sixth embodiment of this invention including a remote maintenance record file providing device through electronic communication means, and in which a remote maintenance service is carried out by a remote maintenance service provider 10, being a subject of providing a remote maintenance service, based on a contract between the mentioned remote maintenance service provider 10 and a customer, the remote monitoring system for uninterruptible power supply includes: a transmitter-receiver 51 for conducting transmission/receiving of information to and from a power facility on the side of the customer; a storage device 52 for storing information of a remote maintenance record file capable of being transmitted by electronic communication means for a particular customer in which information of the power facility, being an object of receiving an contract for a remote maintenance contract is described, and information of a standard remote maintenance record file capable of being transmitted by electronic communication means for a general customer; and a processor 50 for conducting processing with the use of the mentioned transmitter-receiver 51 and the mentioned storage device 52; in which the mentioned transmitter-receiver 51 receives a customer identification information from the mentioned customer terminal, the mentioned processor 50 reads the mentioned maintenance record or the mentioned standard maintenance information out of the mentioned storage device 52 based on the mentioned customer identification information, and causes the mentioned transmitter-receiver 51 to transmit the read maintenance record to the mentioned customer side terminal or the mentioned provider side terminal. As a result, it becomes possible to achieve a remote monitoring system for uninterruptible power facility in which remote maintenance record file can be provided without fail with the use of the remote maintenance record providing apparatus by electronic communication means utilizing any communication line network such as telephone. Consequently, a smooth information communication mutually between the remote maintenance service provider and the customer is achieved.

Embodiment 7.

Figure 7:
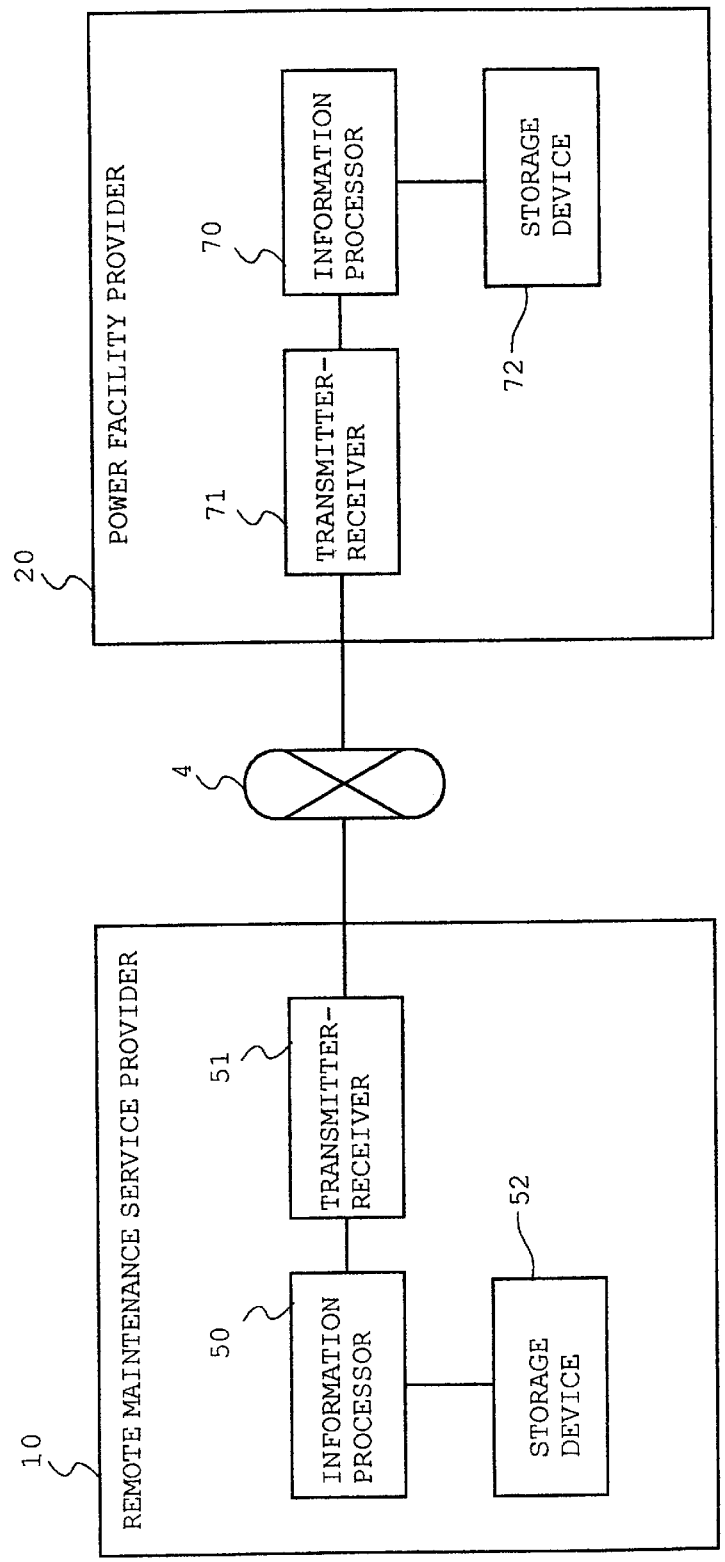
FIG. 7 a block diagram showing an arrangement of a remote monitoring system for an uninterruptible power facility according to a seventh embodiment of the invention.
Figure 8:
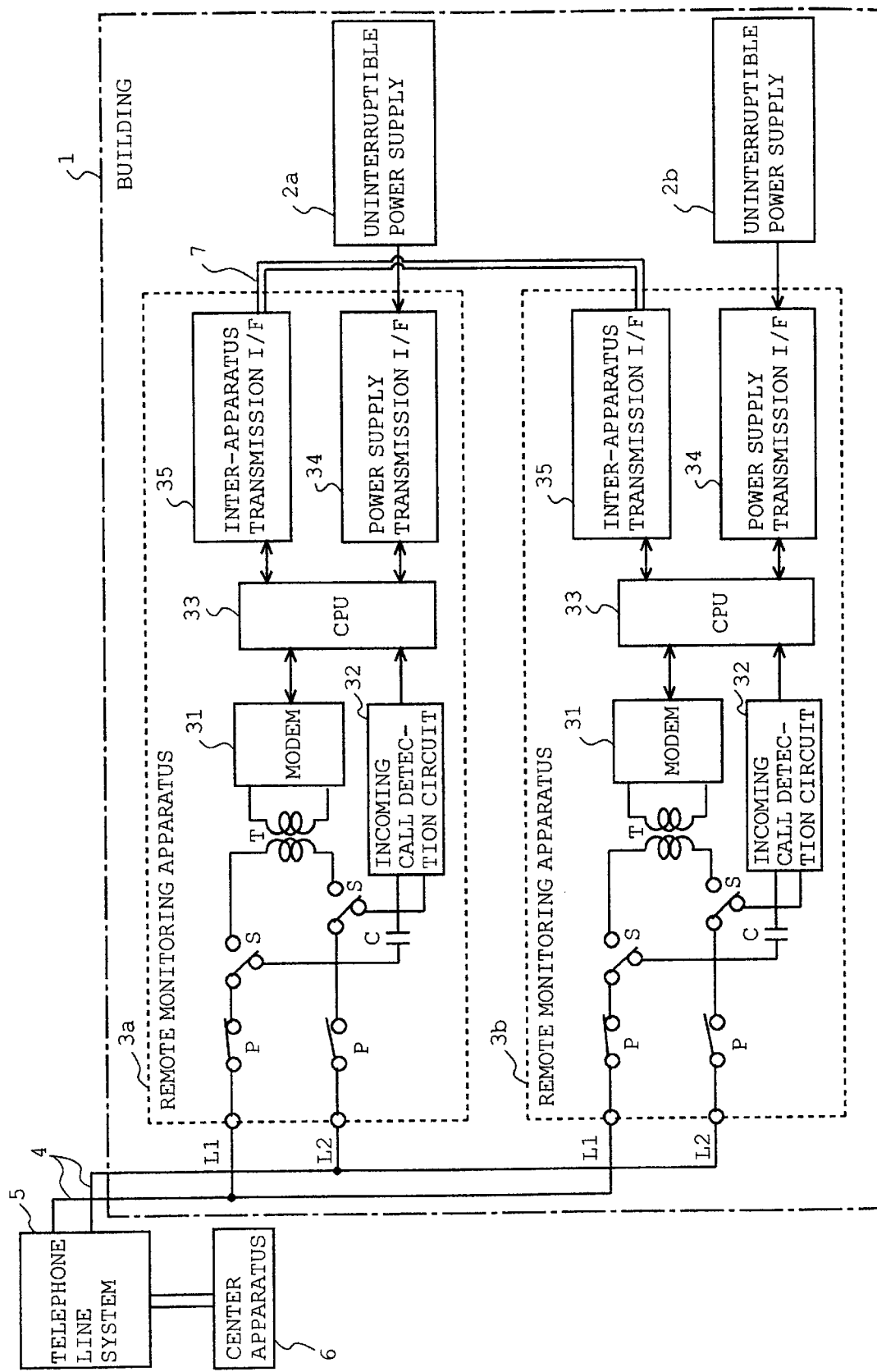
FIG. 8 is a block diagram showing an arrangement of a remote monitoring apparatus an for uninterruptible power supply according to the prior art.

A seventh preferred embodiment according to this invention is hereinafter described with reference to FIG. 7. FIG. 7 is a block diagram showing an arrangement of an apparatus in which the standard remote maintenance record file and the particular remote maintenance record file are prepared on the side of the remote maintenance service provider based on article information such as electric equipment inputted by the power supply provider, and maintenance information of power facility composed of any electric apparatus.

This seventh embodiment comprises the same arrangement and achieves the same advantages as in the foregoing fifth embodiment except specific constitution described herein. The same reference numerals are designated to the same or like parts.

FIG. 7 shows that apparatuses on the side of the remote maintenance service provider 10 and the power facility provider 20 are arranged into the same constitution.

The information processor 50 on the side of the remote maintenance service provider 10, serving as a terminal of the power facility provider 20, using the transmitter-receiver 51 via the communication line 4, communicates with a transmitter-receiver 71 for conducting the transmission/receiving of information to and from an information processor 70 on the side of the power facility provider 20. Then, the information processor 50 stores information in the storage device 52 that stores an article information or maintenance information of, e.g., electric equipment concerning the power facility including the uninterruptible power supply, being an object of receiving the remote maintenance service contract. Then, the information processor 50 processes, based on the customer identification information, various database information of, e.g., the electric equipment recorded in the storage device 52 by means of the information processor 50 processing a variety of databases, using the transmitter-receiver 51 and the storage device 52. Subsequently, the information processor 50 prepares a remote maintenance record file for a particular customer capable of being be transmitted by electronic communication means and in which the electric equipment or maintenance information is described, and a standard maintenance record file for a general customer different from the mentioned particular remote maintenance record file for a particular customer.

Referring to the diagram, the information processor 50 is arranged so as to receive the information provided by the information processor 70. In the case of using, for example, an open network such as Internet as a network via the communication line 4, by carrying out such an operation as to access to information at midnight or early in the morning when burden on the communication is relatively reduced, the information processor 50 can receive the information provided by the information processor 70 efficiently at a lower cost.

That is, a remote monitoring system for uninterruptible power supply according to the sixth embodiment of this invention including a remote maintenance record file providing device through electronic communication means, and in which a remote maintenance service is carried out by a remote maintenance service provider 10, being a subject of providing a remote maintenance service, based on a contract between the mentioned remote maintenance service provider 10 and a customer, the remote monitoring system for uninterruptible power supply includes: a transmitter-receiver 71 for conducting transmission/receiving of information to and from a terminal on the side of the customer; a storage device 72 for storing electric equipment information received by the mentioned transmitter-receiver 71, the information being relevant to a power facility including an uninterruptible power supply, being an object of a remote maintenance service contract; and a processor 70 for conducting processing with the use of the mentioned transmitter-receiver 71 and the mentioned storage device 72; in which the mentioned processor 70 prepares, using the electric equipment information stored in the mentioned storage device 72, a remote maintenance record file for a particular customer capable of being transmitted by electronic communication means and in which the mentioned electric equipment information is described, and a standard remote maintenance record file for a general customer being different from the mentioned particular remote maintenance record file and in which the mentioned electric equipment information is described. As a result, it becomes possible to achieve a remote monitoring system for uninterruptible power facility in which remote maintenance record file can be prepared without fail with the use of the remote maintenance record providing apparatus by electronic communication means utilizing any communication line network such as telephone. Consequently, a smooth information communication mutually between the remote maintenance service provider and the customer is achieved.

The foregoing embodiments of the invention intend to obtain a remote monitoring maintenance method of a remote monitoring system for uninterruptible power facility. For example, in the remote monitoring system for uninterruptible power facility at the center apparatus installed in the remote maintenance service provider, an order for the remote maintenance service from a customer is received on the basis of the maintenance file capable of being transmitted by the electronic communication means, and a daily or regular remote maintenance is started on the same day when the order for the remote maintenance service concerning the power facility proper to the particular customer has been received. Then, operating management and diagnosis are carried out so that the power facility of the customer may continue a sound operation at all times, and the customer is kept informed of contents of the power supply operation management immediately with the use of the remote maintenance record file electronically recorded. In this manner, immediate effect or convenience is improved in providing information regarding maintenance situation or result of diagnosis to the customer who possesses the power facility. In addition, any particular customer is provided with detailed maintenance information, thereby making it possible to carry out the operation management and maintenance planning of the power facility by the customer itself.

The remote monitoring system for uninterruptible power facility and the remote monitoring maintenance method according to the embodiments of the invention is carried out by providing: an apparatus and means for receiving from the customer an order for remote maintenance service based on the remote maintenance service contents offered by the provider for carrying out the remote maintenance service to the power facility including the uninterruptible power supply; an apparatus and means by which the remote maintenance service provider provides the remote maintenance record file to the general customer capable of being commonly used at the time of conducting the remote maintenance service of the power facility; an apparatus and means for providing a remote maintenance record file specific or proper to the particular customer; and an apparatus and means for preparing a commonly used remote maintenance record file or a remote maintenance record file proper to a particular customer on the provider side for carrying out the remote maintenance service, based on a standard information common to power facilities inputted by the provider including the uninterruptible power supply forming apparatuses or electric equipment, or the information of the power facility proper to the specific customer.

The invention relates to the remote monitoring maintenance method of the remote monitoring system for interruptible power facility allowing a customer, who requests a remote maintenance service (a general customer or a customer who has already conclude a part of the contract for remote maintenance service) to select on line any desired remote maintenance service item utilizing a standard remote maintenance record file or a particular remote maintenance record. In the remote monitoring maintenance method, particularly when any remote maintenance service of the power facility including an uninterruptible power supply used for a computer power supply is carried out on line utilizing any communication line, the electronic remote maintenance record file stored in the center apparatus installed in the provider for conducting the remote maintenance service is used in such a manner that the general customer is allowed/to view the standard maintenance record file in which inspection manual such as points or process for the maintenance is described.

Furthermore, in favor of the particular customer who has made a contract for the remote maintenance service, the maintenance record file (personal maintenance record file) for exclusive use of the particular customer, useful not only as the general maintenance manual for the maintenance but also useful in inspection of operating state or detection of abnormality concerning the power facility proper to the particular customer, is ready for providing diagnostic information of the power facility.

What is claimed is:

1. A remote monitoring system for an uninterruptible power facility in which maintenance service is carried out by a remote maintenance service provider based on a contract between the remote maintenance service provider and a customer, the remote monitoring system for interruptible power supply including:

means for a customer to input customer identification information relating to the customer who possesses a power facility including an uninterruptible power supply receiving remote maintenance service;

means for the customer to view a particular remote maintenance record file capable of being transmitted by communication means and in which a maintenance information about the power facility including the uninterruptible power supply is described; and means for the customer to transmit an order using the electronic communication means based on the remote maintenance record file.

2. The remote monitoring system according to claim 1 including means for the customer to view a standard maintenance record file for a generalized customer.

3. A remote monitoring system for an uninterruptible power supply in which maintenance service is carried out by a remote maintenance service provider, based on a contract between the remote maintenance service provider and a customer, the remote monitoring system for the uninterruptible power supply including:

a means for inputting article information about power supply equipment including an uninterruptible power supply that may receive an order of the remote maintenance service;

means for preparing a remote maintenance record file for a particular customer for transmission by communication means and in which article information is described using at least one of the article information about the power supply equipment or electric appliance, and a standard maintenance record file for a generalized customer for transmission by the communication means, different from the particular remote maintenance record file for a particular customer, and in which the article information is described; and means of providing the prepared particular remote maintenance record file or said standard maintenance record file.

4. The remote monitoring system according to claim 1 including:

means for a provider to input any article information or inspection information of a power facility including an uninterruptible power supply subject to a remote maintenance service; and means of preparing the particular remote maintenance record file for a particular customer for transmission by communication means, and in which the article information is described, using the article information and the inspection information, and a standard remote maintenance record file for the generalized customer for transmission by communication means, and different from the particular remote maintenance record file, and in which the article information is described;

means for the customer to input any customer identification information of the customer; and means for the customer to view information of the particular remote maintenance record file or the standard remote maintenance record file.

5. A remote monitoring system for uninterruptible power facility including a remote maintenance contract receiving device communicating through communication means, and in which maintenance service is carried out by a remote maintenance service provider, based on a contract between the remote maintenance service provider and a customer, the remote monitoring system for the uninterruptible power supply including:

a transmitter-receiver for transmitting and receiving information to and from a particular customer;

a storage device for storing a remote maintenance record file for transmission by communication means and in which information of the power facility that is an object of a contract for remote maintenance, is described; and a processor for processing with said transmitter-receiver and said storage device, wherein when said transmitter-receiver receives any customer identification information identifying a particular customer from a customer side terminal, said processor reads out the remote maintenance record file corresponding to the customer identification information, the remote maintenance record file read out is transmitted to the customer side terminal by said transmitter-receiver, and said transmitter-receiver receives any maintenance information based on the particular maintenance record and transmitted using the communication means.

6. The remote monitoring system according to claim 5, wherein said storage device stores information of a standard remote maintenance record file for transmission by the communication means for a generalized customer, and said transmitter-receiver receives customer identification information from the customer side terminal, said processor reads the maintenance record or standard maintenance information out of said storage device based on the customer identification information, and transmits the maintenance record read to the customer side terminal or to a provider side terminal.

7. The remote monitoring system according to claim 5, wherein said storage device stores electrical equipment information received by said transmitter-receiver, the electrical equipment information relating to a power facility including an uninterruptible power supply that is an object of a remote maintenance service contract; and said processor prepares, using the electric equipment information stored in said storage device, a remote maintenance record file for a particular customer for transmission by the communication means and in which the electric equipment information is described, and a standard remote maintenance record file for a generalized customer, different from the particular remote maintenance record file and in which the electrical equipment information is described.

* * * * *